US012689518B2

(12) United States Patent
Singh et al.

(10) Patent No.: US 12,689,518 B2
(45) Date of Patent: Jul. 21, 2026

(54) QUANTUM PROOF OF CONSENT FOR ORCHESTRATING EVENT PROCESSING ACROSS A DISTRIBUTED NETWORK

(71) Applicant: Bank of America Corporation, Charlotte, NC (US)

(72) Inventors: Shailendra Singh, Thane West (IN); Divya Nagarajan, Chennai (IN); Gowri Sundar Suriyanarayanan, Chennai (IN); Maneesh Kumar Sethia, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 39 days.

(21) Appl. No.: 18/586,757

(22) Filed: Feb. 26, 2024

(65) Prior Publication Data

US 2025/0274288 A1      Aug. 28, 2025

(51) Int. Cl.
| | |
|---|---|
| *H04L 9/32* | (2006.01) |
| *G06N 10/40* | (2022.01) |
| *G06N 10/60* | (2022.01) |

(52) U.S. Cl.
CPC ........... *H04L 9/3236* (2013.01); *G06N 10/40* (2022.01); *G06N 10/60* (2022.01); *H04L 2209/56* (2013.01)

(58) Field of Classification Search
CPC .......... H04L 9/00–50; G06N 10/00–80; G06Q 20/00–425
See application file for complete search history.

(56) References Cited

U.S. PATENT DOCUMENTS

| | | | |
|---|---|---|---|
| 10,708,046 B1 * | 7/2020 | Ashrafi | ................. H04L 9/0852 |
| 11,005,664 B2 | 5/2021 | Chalkias | |
| 11,017,123 B1 | 5/2021 | Salem | |
| 11,212,110 B1 | 12/2021 | Griffin | |
| 11,477,015 B1 | 10/2022 | Smith et al. | |
| 11,569,989 B2 | 1/2023 | Barraza Enciso et al. | |
| 11,621,836 B2 | 4/2023 | Ashrafi | |
| 11,695,570 B1 | 7/2023 | Griffin | |
| 11,750,400 B2 | 9/2023 | Chalkias | |
| 11,784,795 B2 | 10/2023 | Ragan et al. | |
| 11,784,796 B2 | 10/2023 | Ragan et al. | |
| 2019/0019374 A1 | 1/2019 | Foley et al. | |
| 2019/0319798 A1 | 10/2019 | Chalkias | |

(Continued)

*Primary Examiner* — Mohammad A. Nilforoush
(74) *Attorney, Agent, or Firm* — Banner & Witcoff, Ltd.

(57) ABSTRACT

A computing platform may receive an event processing request, and generate a corresponding a first qubit and second qubit. The computing platform may generate, based on the first qubit, a first quhash corresponding to the first qubit. The computing platform may publish the second qubit to the distributed ledger platform, which may generate a corresponding second quhash. The computing platform may cause execution of a Grover's algorithm at the distributed ledger platform to identify a stored quhash matching the first quhash, where the stored quhash matching the first quhash comprises the second quhash. The computing platform may receive, from the distributed ledger platform, the second quhash. The computing platform may decrypt the quhashes to re-produce the corresponding qubits. Based on identifying a match between the qubits, the computing platform may process the requested event, and cause the distributed ledger platform to update a corresponding distributed ledger accordingly.

20 Claims, 7 Drawing Sheets

(56) References Cited

U.S. PATENT DOCUMENTS

| | | | |
|---|---|---|---|
| 2020/0344051 A1 | 10/2020 | Ashrafi | |
| 2021/0126779 A1 | 4/2021 | Barraza Enciso et al. | |
| 2021/0126800 A1* | 4/2021 | De La Rocha Gómez-Arevalillo | H04L 9/0852 |
| 2021/0176072 A1 | 6/2021 | Chalkias | |
| 2022/0385472 A1 | 12/2022 | Pishdadian et al. | |
| 2023/0112482 A1 | 4/2023 | Stockert et al. | |
| 2023/0186293 A1 | 6/2023 | Dolev et al. | |
| 2023/0327885 A1 | 10/2023 | Griffin | |
| 2024/0048369 A1 | 2/2024 | Kam et al. | |
| 2024/0121082 A1* | 4/2024 | Kerling | H04L 9/0852 |

* cited by examiner

100

102

Quantum Entanglement Platform

111

Processor(s)

112

Memory(s)

Quantum Mempool Queue Manager
112a

Quhash Generator
112b

Quantum Circuit
112c

Quantum Notifier
112d

Quantum Validator
112e

113

Communication Interface(s)

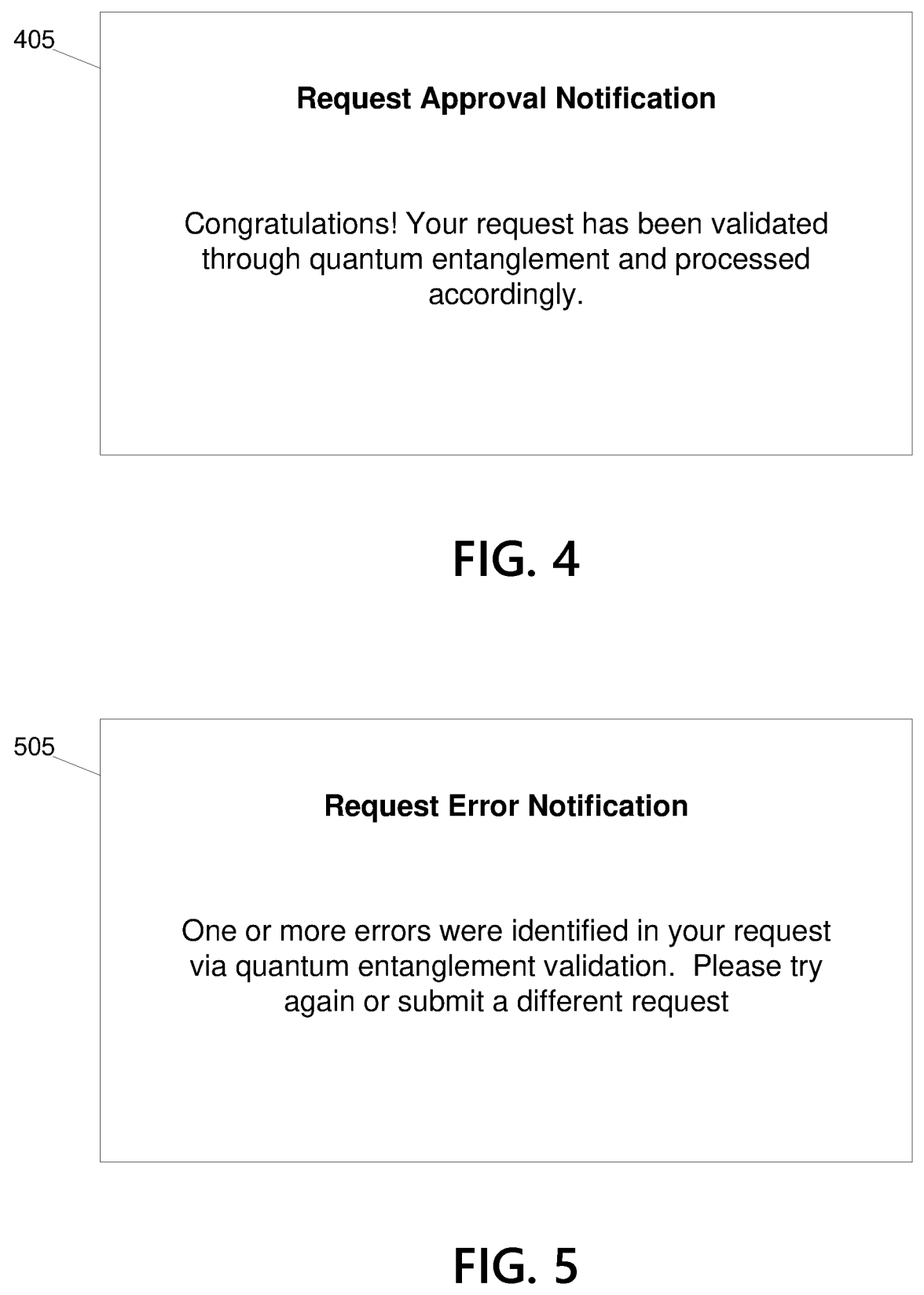

405

Request Approval Notification

Congratulations! Your request has been validated through quantum entanglement and processed accordingly.

Request Error Notification

One or more errors were identified in your request via quantum entanglement validation.  Please try again or submit a different request

FIG. 5

QUANTUM PROOF OF CONSENT FOR ORCHESTRATING EVENT PROCESSING ACROSS A DISTRIBUTED NETWORK

BACKGROUND

In some instances, distributed ledgers may be used to provide enhanced validation capabilities. There may, however, be drawbacks in the use of conventional methods of validation such as proof of work or proof of stake, such as processing delays associated with approving or dismissing requests by the approvers of the ledger. In instances where requests are time sensitive and/or otherwise intolerant of such delays, it may be important to provide an alternative method for providing validation in a distributed ledger environment, while nevertheless maintaining the corresponding advantages of such technology.

SUMMARY

Aspects of the disclosure provide effective, efficient, scalable, and convenient technical solutions that address and overcome the technical problems associated with using proof of consent to validate requests to a distributed ledger. In accordance with one or more embodiments of the disclosure, a computing platform comprising at least one processor, a communication interface, and memory storing computer-readable instructions may receive an event processing request. The computing platform may generate, for the event processing request, a pair of quantum bits ("qubits"), including a first qubit associated with the computing platform and a second qubit associated with a distributed ledger platform. The computing platform may generate, based on the first qubit, a first quantum hash ("quhash") corresponding to the first qubit. The computing platform may publish the second qubit to the distributed ledger platform, which may be configured to generate a second quhash corresponding to the second qubit. The computing platform may cause execution of a Grover's algorithm at the distributed ledger platform to identify a stored quhash matching the first quhash, where the stored quhash matching the first quhash comprises the second quhash. The computing platform may receive, from the distributed ledger platform, the second quhash. The computing platform may decrypt the first quhash and the second quhash to produce the first qubit and second qubit, respectively. The computing platform may compare the first qubit to the second qubit. Based on identifying a match between the first qubit and the second qubit, the computing platform may process the requested event, and cause the distributed ledger platform to update a corresponding distributed ledger to reflect the processed event.

In one or more instances, the event processing request may include a request to exchange a first type of cryptocurrency for a second type of cryptocurrency. In one or more instances, the computing platform may add the event processing request to a processing queue, where generating the pair of qubits may be responsive to the event processing request reaching a front of the processing queue, and where the processing queue may be maintained at a quantum mempool layer of the computing platform.

In one or more examples, based on identifying a discrepancy between the first qubit and the second qubit, the computing platform may send an error notification to a user device associated with the event processing request. In one or more examples, the computing platform may be a quantum computing platform.

In one or more instances, the first qubit and the second qubit may be entangled using a quantum entanglement environment. In one or more instances, generating the first quhash and the second quhash may include identifying, based on a smart contract, a method for hashing for the first qubit and the second qubit. In one or more instances, the smart contract may define correlations between values associated with event processing requests and corresponding hashing methods.

In one or more examples, the method for hashing may include one or more of: a hashing algorithm or additional information to be hashed along with a corresponding qubit to produce a corresponding quhash. In one or more examples, the method for hashing the first qubit and the second qubit may produce a first encrypted quhash and a second encrypted quhash, corresponding to the first qubit and the second qubit respectively.

BRIEF DESCRIPTION OF DRAWINGS

The present disclosure is illustrated by way of example and is not limited in the accompanying figures in which like reference numerals indicate similar elements and in which:

FIGS. 4-5 depict illustrative user interfaces for using quantum proof of consent to orchestrate event processing across a distributed network in accordance with one or more example embodiments.

DETAILED DESCRIPTION

Figure 1A:
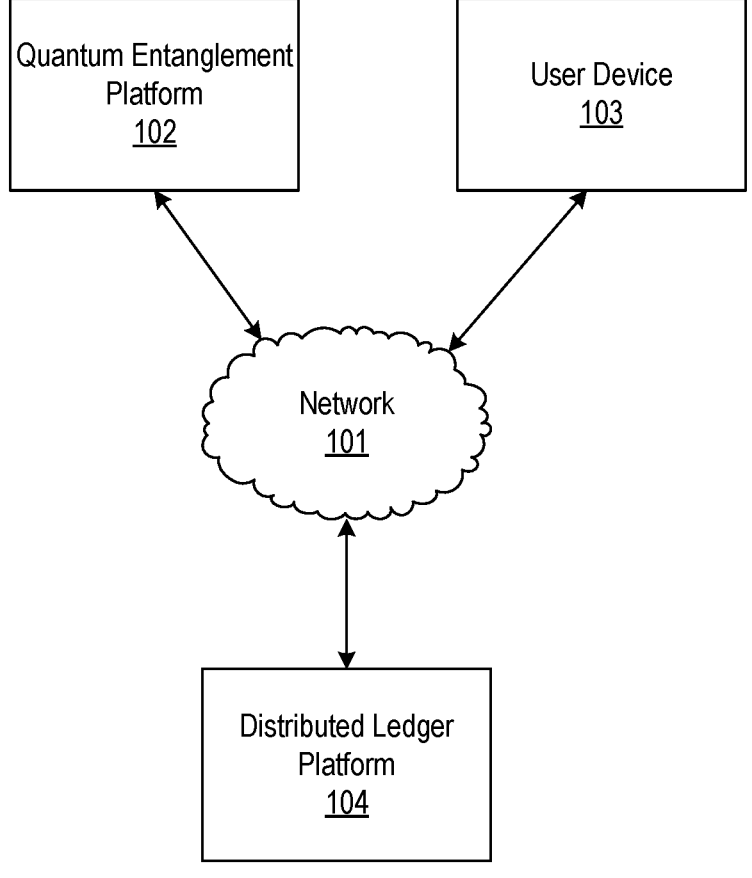
FIGS. 1A and 1B depict an illustrative computing environment for using quantum proof of consent to orchestrate event processing across a distributed network in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

The following description relates to using quantum proof of consent for orchestrating event processing across a distributed network. In the crypto world, where the transactions may be entirely digital and currencies may be crypto, generating fiat currencies may take a long time. The reduction of time between selling the digital currencies and quickly realizing them into fiat currencies may be needed as we progress through the cryptocurrency era.

The drawbacks of proof of work (PoW) may include: 1) potential vulnerability to "51%" attacks, in which a miner may control more than 50% of the entire network's computing power, and 2) the high concentration of mining pools as a form of centralization.

The drawback of proof of stake (POS) may include: 1) lacking in security when compared to proof-of-work, and 2) validators with large holdings may influence the verification of transactions (e.g., a few of the POS cryptos may require locking up staked coins for a certain period of time).

In either case, when there is an increase in the memory pool concentration, there may be a delay in the blocks to be added. The miners in PoW and validators in PoS may commit to large holding transactions, and hence may delay the realization of fiat currency effectively and quickly.

Today, functionalities like transmitting digital currencies from one participant to another exist within one single block chain, but effective exchange across different block chains does not exist in the existing protocols and standards. This interoperability refers to blockchains' capacity to freely exchange data with other blockchains as scope for improvement.

In addition, crypto assets may be digital assets and may require a considerable amount of electricity usage, which can result in greenhouse gas emissions that impact communities near mining facilities.

This technical solution described herein provides the reduction in transaction time and a critical security feature as aspects to overcome issues around the disadvantages of proof of work and proof of stake approaches. This approach may enable quicker consensus, which may be key to this approach.

The quantum entanglement phenomenon may induce change in one entity that will affect another. This approach may enable easier and quicker decisioning of the decentralized system to the 'validator,' hence improving the speed of processing transactions multifold without compromising the security in the solution.

This approach may describe a quantum entanglement system that generates qubits and quhashes from the requestor information and determine a photon pair in subatomic state which determines quick correlation of data, providing fast information and leading to faster outcomes.

The proof in the 'proof of quantum entanglement' consensus mechanism may come from requiring an entangled photon pair that are in super position state which are aligned with decisioning of the consensus. The decisioning at one end may be passed to the other without being connected in a physical network.

The method of decisioning may be orchestrated by a circuit devised by Grover's algorithm. This orchestration may help in identifying the node in an unstructured block chain network, which may publish the same the quhash address as the source photon. The process also may invite more than one node that complements additional nodes and may help with quicker consensus and confirmation of the transaction.

The approach devised by Grover's algorithm may help in achieving quicker consensus across multiple block chain networks using a quantum hash address across source and nodes. These and other features are described in greater detail below.

Figure 1B:
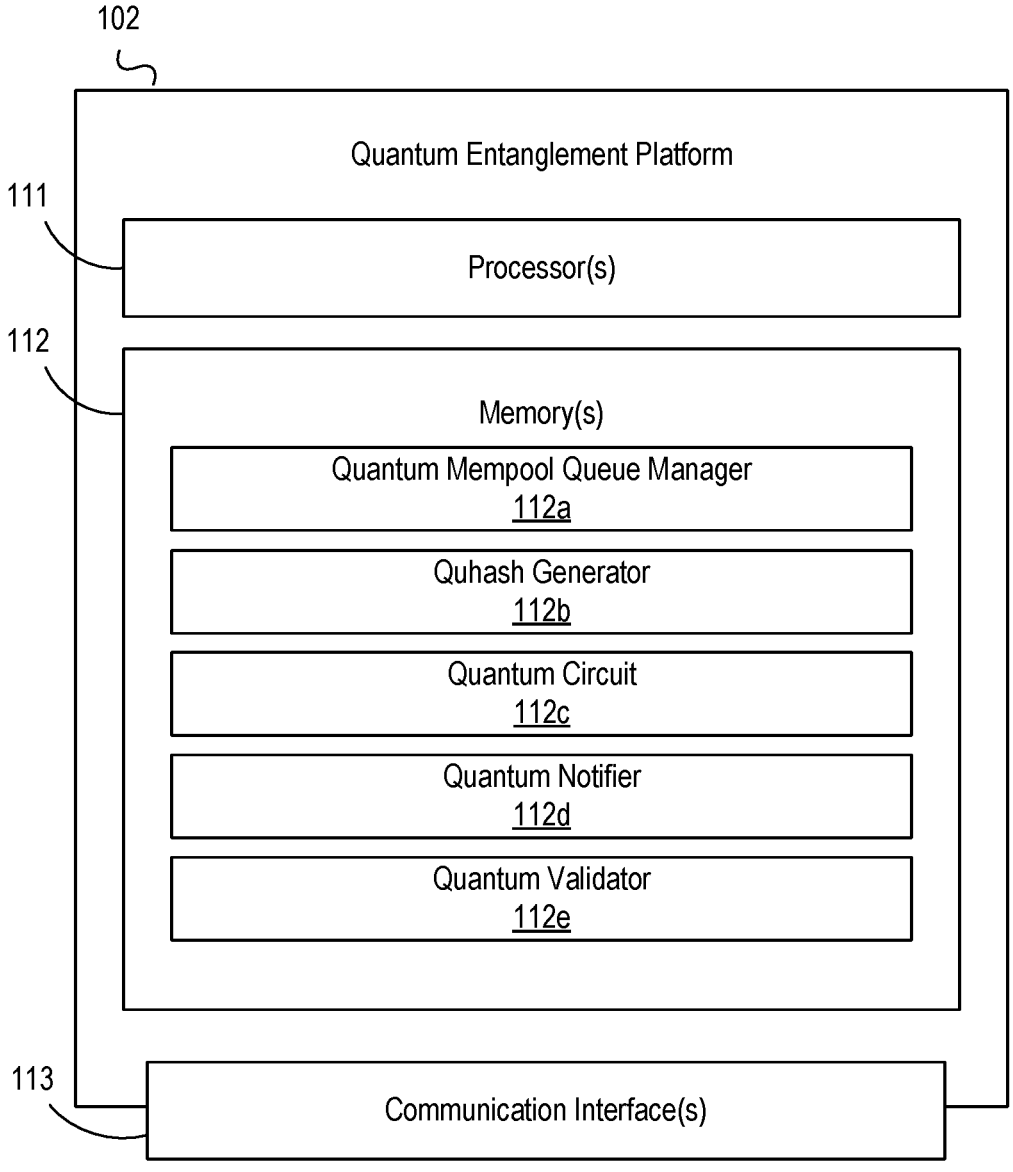

FIGS. 1A-1B depict an illustrative computing environment for using quantum proof of consent for orchestrating event processing across a distributed network in accordance with one or more example embodiments. Referring to FIG. 1A, computing environment 100 may include one or more computer systems. For example, computing environment 100 may include quantum entanglement platform 102, user device 103, and distributed ledger platform 104.

Quantum entanglement platform 102 may include one or more computing devices (servers, server blades, or the like) and/or other computer components (e.g., processors, memories, communication interfaces, or the like). For example, the quantum entanglement platform 102 may be configured to generate a pair of qubits, connected via quantum entanglement. The quantum entanglement platform 102 may further be configured to encrypt (and/or communicate with the distributed ledger platform 104 to encrypt) the qubits. The quantum entanglement platform 102 may further be configured to decrypt quhashes corresponding to the qubits, and compare the resulting qubits to identify a match for the validation of requested events.

User device 103 may be or include one or more devices (e.g., laptop computers, desktop computer, smartphones, tablets, and/or other devices) configured for use in requesting event processing. For example, the user device 103 may be used to send requests to convert cryptocurrency into fiat currency and/or a different type of cryptocurrency. Any number of such user devices may be used to implement the techniques described herein without departing from the scope of the disclosure.

Distributed ledger platform 104 may be or include one or more computing devices (e.g., servers, server blades, or the like) and/or other computer components (e.g., processors, memories, communication interfaces, or the like). For example, distributed ledger platform 104 may be configured to establish, store, and/or otherwise maintain one or more distributed ledgers. In some instances, the distributed ledger platform 104 may be configured to encrypt qubits to produce quhashes, and to apply a Grover's algorithm to quhash matches, as is described further below.

Computing environment 100 also may include one or more networks, which may interconnect quantum entanglement platform 102, user device 103, and distributed ledger platform 104. For example, computing environment 100 may include a network 101 (which may interconnect, e.g., quantum entanglement platform 102, user device 103, and distributed ledger platform 104).

In one or more arrangements, quantum entanglement platform 102, user device 103, and distributed ledger platform 104 may be any type of computing device capable of receiving a user interface, receiving input via the user interface, and communicating the received input to one or more other computing devices. For example, quantum entanglement platform 102, user device 103, distributed ledger platform 104, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of quantum entanglement platform 102, user device 103, and distributed ledger platform 104 may, in some instances, be special-purpose computing devices configured to perform specific functions.

Referring to FIG. 1B, quantum entanglement platform 102 may include one or more processors 111, memory 112, and communication interface 113. A data bus may interconnect processor 111, memory 112, and communication interface 113. Communication interface 113 may be a network interface configured to support communication between quantum entanglement platform 102 and one or more networks (e.g., network 101, or the like). Memory 112 may include one or more program modules having instructions that when executed by processor 111 cause quantum entanglement platform 102 to perform one or more functions described herein and/or one or more databases that may store and/or otherwise maintain information which may be used by such program modules and/or processor 111. In some instances, the one or more program modules and/or databases may be stored by and/or maintained in different memory units of quantum entanglement platform 102 and/or by different computing devices that may form and/or otherwise make up quantum entanglement platform 102. For example, memory 112 may have, host, store, and/or include quantum mempool queue manager 112*a*, quhash generator 112*b*, quantum circuit 112*c*, quantum notifier 112*d*, and quantum validator 112*e*. Quantum mempool queue manager 112*a* may have instructions that cause quantum entanglement platform 102 to queue event processing requests for validation. Quhash generator 112*b* may have instructions that cause quantum entanglement platform 102 to generate qubits representative of an event processing request, and to encrypt them as quhashes accordingly. Quantum circuit 112*c* may facilitate a connection between the quantum entanglement platform 102 and the distributed ledger platform 104 for the purposes of validating qubits to establish proof of consent for a request. The quantum notifier 112*d* may facilitate transmission of quhashes between the distributed ledger platform 104 and the quantum validator 112*e* for comparison. The quantum validator 112*e* may have instructions that cause quantum entanglement platform 102 to validate requests by decrypting quhashes and comparing the resulting qubits.

Figure 2A:
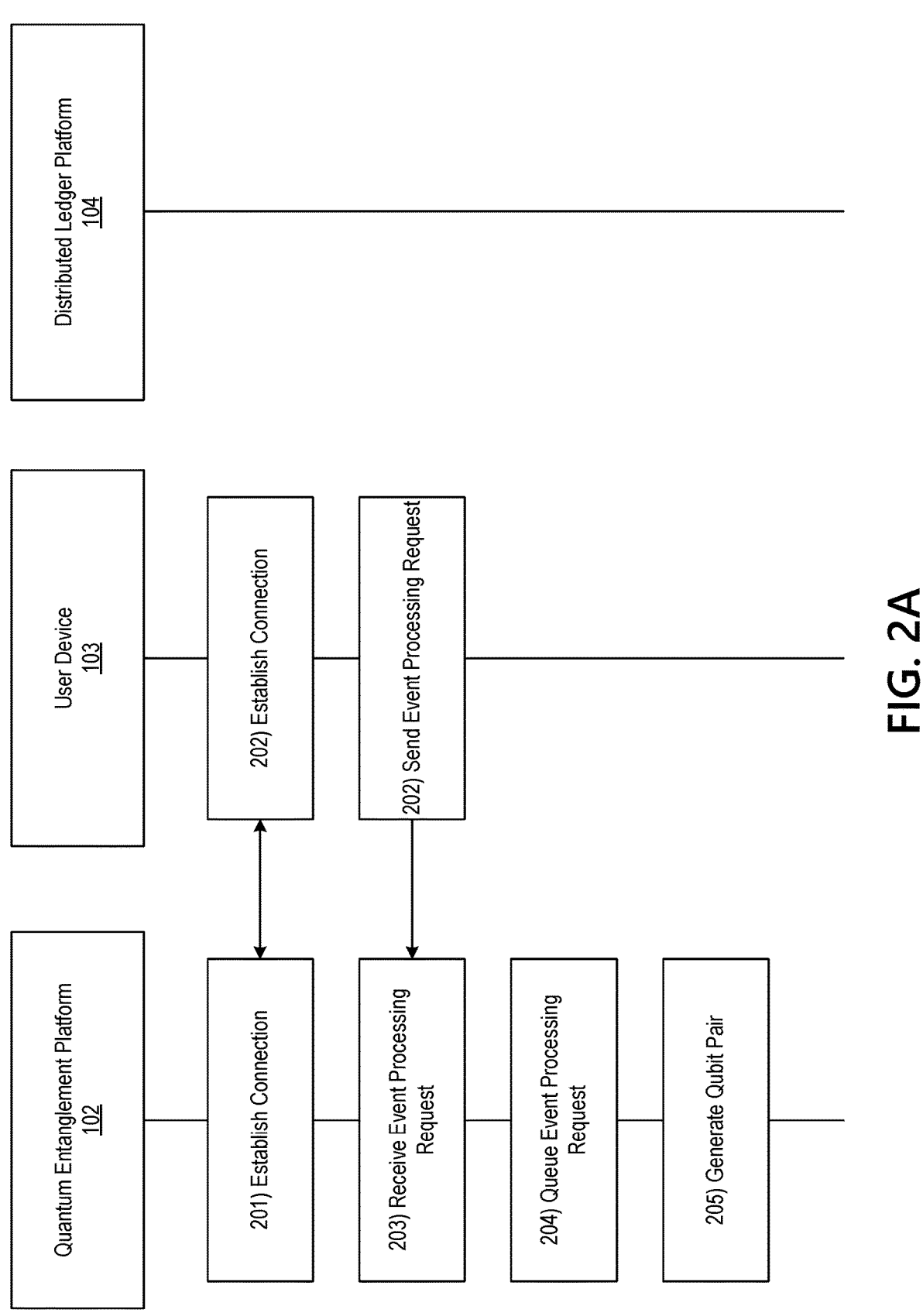
FIGS. 2A-2C depict an illustrative event sequence for using quantum proof of consent to orchestrate event processing across a distributed network in accordance with one or more example embodiments.
Figure 2B:
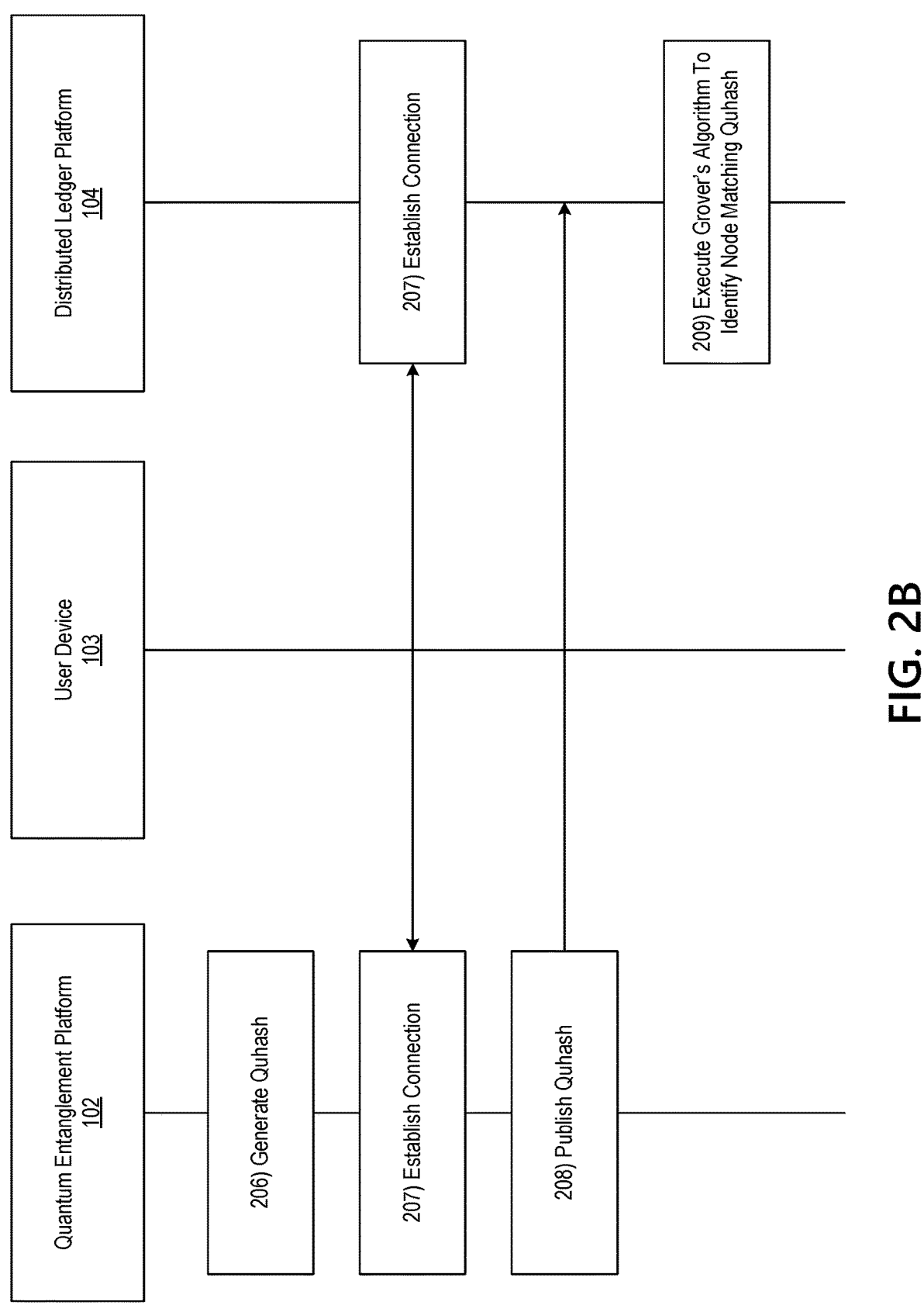
Figure 2C:
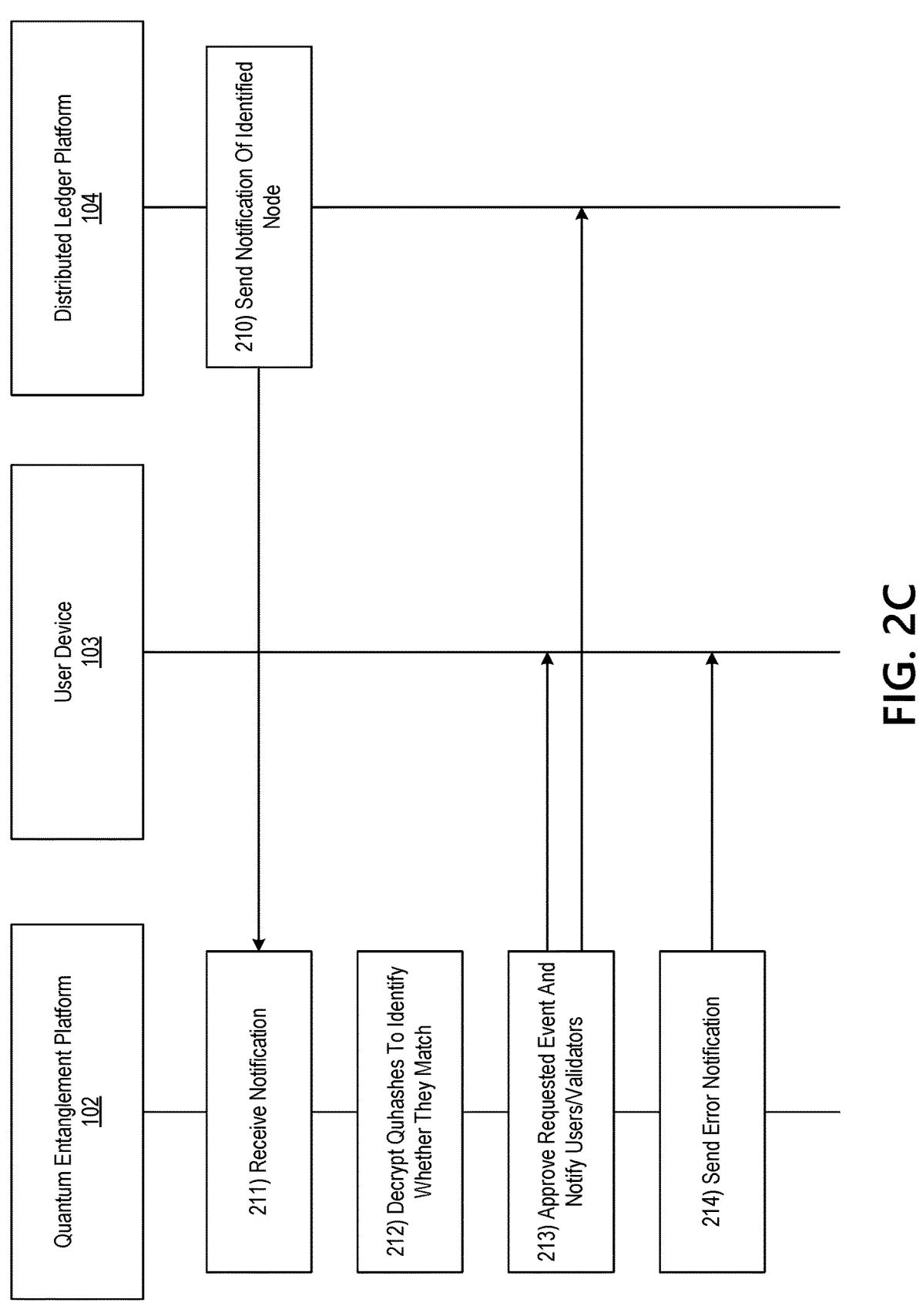

FIGS. 2A-2C depict an illustrative event sequence for quantum proof of consent for orchestrating event processing across a distributed network in accordance with one or more example embodiments. Referring to FIG. 2A, at step 201, the user device 103 may establish a connection with the quantum entanglement platform 102. For example, the user device 103 may establish a first wireless data connection with the quantum entanglement platform 102 to link the user device 103 to the quantum entanglement platform 102 (e.g., in preparation for sending event processing requests). In some instances, the user device 103 may identify whether a connection is already established with the quantum entanglement platform 102. If a connection is already established with the quantum entanglement platform 102, the user device 103 might not re-establish the connection. Otherwise, if a connection is not yet established, the user device 103 may establish the first wireless data connection as described herein.

At step 202, the user device 103 may send an event processing request to the quantum entanglement platform 102. For example, in sending the event processing request, the user device 103 may send a request to convert a first quantity of a first cryptocurrency to a second quantity (which may, e.g., be the same or different than the first quantity) of a second cryptocurrency, fiat currency, and/or other currency. In some instances, the user device 103 may send the event processing request to the quantum entanglement platform 102 while the first wireless data connection is established.

At step 203, the quantum entanglement platform 102 may receive the event processing request sent at step 202. For example, the quantum entanglement platform 102 may receive the event processing request via the communication interface 113 and while the first wireless data connection is established.

At step 204, the quantum entanglement platform 102 may queue the event processing request. For example, the quantum entanglement platform 102 may add the event processing request to a quantum mempool layer, which may e.g., store requests for processing. In some instances, the quantum mempool layer may queue the requests in the order they are received (e.g., the oldest queued request may be the next for processing). Once the event processing request is dispatched from the queue, the quantum entanglement platform 102 may proceed to step 205.

At step 205, the quantum entanglement platform 102 may generate, for the event processing request, a qubit pair including a first qubit and a second qubit. In these instances, the first qubit may be associated with a first qubit path corresponding to the quantum entanglement platform 102, whereas the second qubit may be associated with a second qubit path corresponding to the distributed ledger platform 104. In these instances, the first qubit and the second qubit may be entangled using a quantum entanglement environment.

Referring to FIG. 2B, at step 206, the quantum entanglement platform 102 may generate a first quhash corresponding to the first qubit. For example, the quantum entanglement platform 102 may identify, based on a smart contract defining hashing protocols for various request characteristics (e.g., a first protocol for requests of a first value range, second protocol for requests of a second value range, or the like). In these instances, the hashing protocols defined by the smart contract may include one of more of: a particular hashing algorithm for use, additional information to be included in the hashing process (e.g., appending additional information to the request, or the like), and/or other information. Accordingly, the quantum entanglement platform 102 may use the smart contract to identify, based on characteristics and/or other properties of the event processing request, a hashing protocol for the first qubit. Once such a hashing protocol is identified, the quantum entanglement platform 102 may execute the hashing protocol on the first qubit to produce the first quhash.

In some instances, the quantum entanglement platform 102 may produce a second quhash for the second qubit in a similar manner, and may cause the second quhash to be stored at the distributed ledger platform 104. In other instances, the quantum entanglement platform 102 may share the second qubit (and in some instances, the identified hashing protocol) with the distributed ledger platform 104, and the distributed ledger platform 104 may produce the second quhash accordingly. In either instance, the distributed ledger platform 104 may store the second quhash to a node of the distributed ledger.

At step 207, the quantum entanglement platform 102 may establish a connection with the distributed ledger platform 104. For example, the quantum entanglement platform 102 may establish a second wireless data connection with the distributed ledger platform 104 to link the quantum entanglement platform 102 to the distributed ledger platform 104 (e.g., in preparation for performing qubit validation with the distributed ledger). In some instances, the quantum entanglement platform 102 may identify whether a connection is already established with the distributed ledger platform 104. If a connection is already established with the distributed ledger platform 104, the quantum entanglement platform 102 might not re-establish the connection. If a connection is not yet established with the distributed ledger platform 104, the quantum entanglement platform 102 may establish the second wireless data connection as described herein.

At step 208, the quantum entanglement platform 102 may publish the first quhash to the distributed ledger platform 104. For example, the quantum entanglement platform 102 may publish the first quhash via the communication interface 113 and while the second wireless data connection is established. In some instances, the quantum entanglement platform 102 may also send one or more commands that may cause the distributed ledger platform 104 to execute an algorithm to identify a stored quhash matching the first quhash as described below at step 209.

At step 209, based on or in response to the one or more commands directing the distributed ledger platform 104 to execute the matching algorithm, the distributed ledger platform 104 may execute an algorithm to identify a quhash and corresponding node that match the first quhash. For example, the distributed ledger platform 104 may execute a Grover's algorithm, using the first quhash as an input. In doing so, the distributed ledger platform 104 may identify a matching quhash, such as the second quhash.

In some instances, the distributed ledger platform 104 may cache the results of the algorithm, thus making such results available on demand for future requests. In some instances, the distributed ledger platform 104 may access one or more smart contracts that may define a caching protocol for the results, including what and/or how much information should be cached for requests corresponding to various properties/characteristics (e.g., transaction value thresholds, geocoordinates, and/or other properties/characteristics). For example, certain requests may prioritize quicker processing times, and thus the results should be cached for quicker access. In contrast, certain requests may prioritize security, and thus the results might not be cached (thus causing the Grover's algorithm to be re-executed each time the corresponding qubit is requested).

Referring to FIG. 2C, at step 210, the distributed ledger platform 104 may send a notification of the identified node and quhash to the quantum entanglement platform 102. For example, the distributed ledger platform 104 may send the identified node notification to the quantum entanglement platform 102 while the second wireless data connection is established.

At step 211, the quantum entanglement platform 102 may receive the notification sent at step 210. For example, the quantum entanglement platform 102 may receive the notification via the communication interface 113 and while the second wireless data connection is established.

At step 212, the quantum entanglement platform 102 may decrypt the first quhash (e.g., to reveal the first qubit) and the matching quhash identified at step 209 (e.g., to reveal the corresponding qubit). The quantum entanglement platform 102 may compare these qubits to identify whether or not there is a match. If there is an identified match (i.e., if the second qubit is revealed in the decryption of the matching quhash), the quantum entanglement platform 102 may proceed to step 213. Otherwise, if a match is not identified, the quantum entanglement platform 102 may proceed to step 214.

At step 213, the quantum entanglement platform 102 may approve the requested event and cause it to be processed. For example, the quantum entanglement platform 102 may cause requested cryptocurrency and/or fiat transfers, conversions, and/or other transactions to be processed. In doing so, the quantum entanglement platform 102 may also send notifications to the user device 103 and the validators of the distributed ledger platform 104 indicating the successful processing of the event. For example, the quantum entanglement platform 102 may send such notifications via the communication interface 113 and while the first and/or second wireless data connections are established. In some instances, the quantum entanglement platform 102 may also send one or more commands directing display of the notification. For example, the quantum entanglement platform 102 may send commands directing the user device 103 to display a graphical user interface similar to graphical user interface 405 in FIG. 4 (e.g., indicating that the requested event was successfully processed), which may, e.g., cause the user device 103 to display the interface accordingly. In some instances, in notifying the validators of the distributed ledger, the quantum entanglement platform 102 may direct and/or otherwise cause the distributed ledger platform 104 to record the processed event to the distributed ledger (e.g., add a new entry to the ledger, or the like).

At step 214, the quantum entanglement platform 102 may send an error notification to the user device 103 indicating that the requested event was not processed. For example, the quantum entanglement platform 102 may send the error notification via the communication interface and while the first wireless data connection is established. In some instances, the quantum entanglement platform 102 may send one or more commands directing the user device 102 to display the error notification, which may, e.g., cause the user device 103 to display the error notification. For example, the user device 103 may display a graphical user interface similar to graphical user interface 505, which is illustrated in FIG. 5.

By operating in this way, any qubit information published to the distributed ledger may be encrypted, thus providing a security advantage over the publishing of unencrypted event processing information. Furthermore, by utilizing a quantum computing system, the speed at which such events are processed may be increased. Additionally, by using the quhash and qubit information to automatically perform request validation, the speed of consensus in a distributed ledger environment may be significantly increased. As a result, because a significant amount of processing resources may be involved in reaching such a consensus, the carbon foot print of the consensus process may be reduced.

Figure 3:
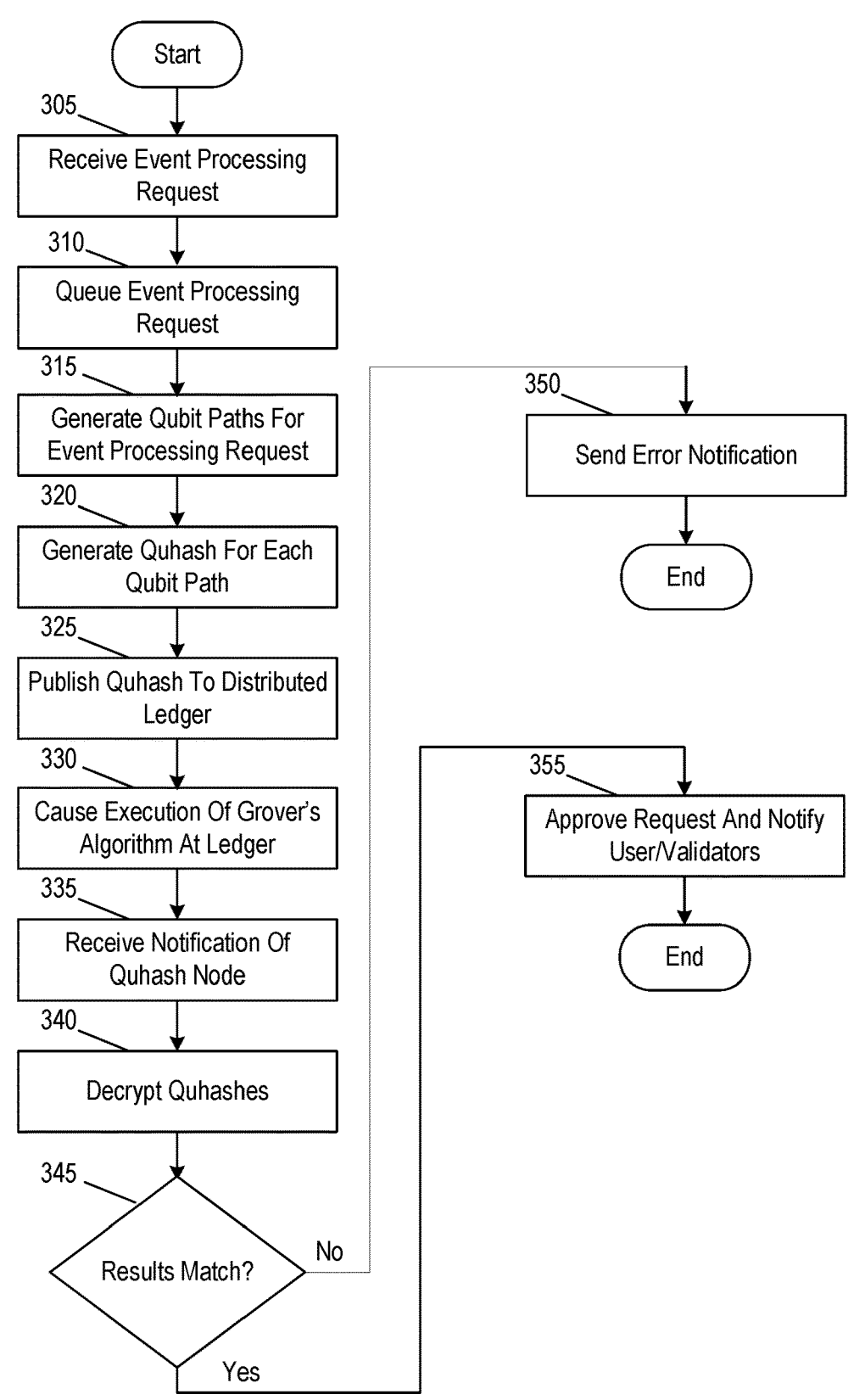
FIG. 3 depicts an illustrative method for using quantum proof of consent to orchestrate event processing across a distributed network in accordance with one or more example embodiments.

FIG. 3 depicts an illustrative method for using quantum proof of consent to orchestrate event processing across a distributed network in accordance with one or more example embodiments. Referring to FIG. 3, at step 305, a computing platform comprising one or more processors, memory, and a communication interface may receive an event processing request. At step 310, the computing platform may queue the event processing request. At step 315, the computing platform may generate qubits for the event processing request. At step 320, the computing platform may encrypt the qubits as quhashes and cause storage of the quhashes at the computing platform (e.g., a first quhash) and a distributed ledger (e.g., a second quhash), respectively. At step 325, the computing platform may publish the first quhash to the distributed ledger. At step 330, the computing platform may cause execution of Grover's algorithm at the distributed ledger to identify a quhash matching the first quhash. At step 335, the computing platform may receive a notification of the matching quhash. At step 340, the computing platform may decrypt the first quhash and the identified matching quhash to produce their corresponding qubits. At step 345, the computing platform may identify whether the corresponding qubits match. If the qubits do match, the computing platform may proceed to step 355. At step 355, the computing platform may approve the request and send approval notifications. Returning to step 345, if the qubits do not match, the computing platform may proceed to step 350.

At step 350, the computing platform might not approve the request, and may instead send an error notification.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A quantum entanglement computing-platform comprising:

at least one processor;

a communication interface communicatively coupled to the at least one processor; and memory storing a quantum mempool queue manager, a quhash generator, a quantum circuit, a quantum notifier, a quantum validator, and computer-readable instructions that, when executed by the at least one processor, cause the computing-quantum entanglement platform to:

receive an event processing request comprising a request to sell a first cryptocurrency in exchange for fiat currency;

add, via the quantum mempool queue manager, the event processing request to a processing queue maintained at a quantum mempool layer of the quantum entanglement platform;

responsive to the event processing request reaching a front of the processing queue, validate and process the event processing request using quantum proof of consent, wherein validating and processing the event processing request using the quantum proof of consent comprises:

generating, via the quhash generator and for the event processing request, a pair of qubits comprising an entangled photon pair in a superposition state, wherein the entangled photon pair comprises a first qubit associated with the quantum entanglement platform and a second qubit associated with a distributed ledger platform;

generating, via the quhash generator and based on the first qubit, a first quhash corresponding to the first qubit by:

identifying, based on a smart contract defining hashing protocols for request characteristics, a hashing protocol for the first qubit, and executing the hashing protocol on the first qubit;

publishing the second qubit to the distributed ledger platform, wherein the distributed ledger platform is configured to:

generate a second quhash corresponding to the second qubit, and store the second quhash to a node of the distributed ledger;

sending, via the quantum circuit, one or more commands directing the distributed ledger platform to execute a Grover's algorithm to identify a node in the distributed ledger matching the first quhash, wherein the second quhash is stored at the node, and wherein sending the one or more commands directing the distributed ledger platform to execute the Grover's algorithm causes the distributed ledger platform to execute the Grover's algorithm;

receiving, via the quantum notifier and from the distributed ledger platform, the second quhash;

decrypting, via the quantum validator, the first quhash and the second quhash to produce the first qubit and second qubit respectively;

comparing, via the quantum validator, the first qubit to the second qubit; and based on identifying a match between the first qubit and the second qubit:

processing the requested event, and causing the distributed ledger platform to update a corresponding distributed ledger to reflect the processed event.

2. The quantum entanglement platform of claim 1, wherein the event processing request comprises a request to exchange a first type of cryptocurrency for a second type of cryptocurrency.

3. The quantum entanglement platform of claim 1, wherein the memory stores additional computer readable instructions that, when executed by the at least one processor, cause the quantum entanglement platform to:

based on identifying a discrepancy between the first qubit and the second qubit, send an error notification to a user device associated with the event processing request.

4. The quantum entanglement platform of claim 1, wherein the smart contract defines correlations between values associated with event processing requests and corresponding hashing methods.

5. The quantum entanglement platform of claim 1, wherein executing the hashing protocol on the first qubit produces a first encrypted quhash corresponding to the first qubit.

6. A method comprising:

at a quantum entanglement platform comprising at least one processor, a communication interface, and memory storing a quantum mempool queue manager, a quhash generator, a quantum circuit, a quantum notifier, and a quantum validator:

receiving an event processing request comprising a request to sell a first cryptocurrency in exchange for fiat currency;

adding, via the quantum mempool queue manager, the event processing request to a processing queue maintained at a quantum mempool layer of the quantum entanglement platform;

responsive to the event processing request reaching a front of the processing queue, validating and processing the event processing request using quantum proof of consent, wherein validating and processing the event processing request using the quantum proof of consent comprises:

generating, via the quhash generator and for the event processing request, a pair of qubits comprising an entangled photon pair in a superposition state, wherein the entangled photon pair comprises a first qubit associated with the quantum entanglement platform and a second qubit associated with a distributed ledger platform;

generating, via the quhash generator and based on the first qubit, a first quhash corresponding to the first qubit by:

identifying, based on a smart contract defining hashing protocols for request characteristics, a hashing protocol for the first qubit, and executing the hashing protocol on the first qubit;

publishing the second qubit to the distributed ledger platform, wherein the distributed ledger platform is configured to:

generate a second quhash corresponding to the second qubit, and store the second quhash to a node of the distributed ledger;

sending, via the quantum circuit, one or more commands directing the distributed ledger to execute a Grover's algorithm to identify a node in the distributed ledger matching the first quhash, wherein the second quhash is stored at the node, and sending the one or more commands directing the distributed ledger platform to execute the Grover's algorithm causes the distributed ledger platform to execute the Grover's algorithm;

receiving, via the quantum notifier and from the distributed ledger platform, the second quhash;

decrypting, via the quantum validator, the first quhash and the second quhash to produce the first qubit and second qubit respectively;

comparing, via the quantum validator, the first qubit to the second qubit; and based on identifying a match between the first qubit and the second qubit:

processing the requested event, and causing the distributed ledger platform to update a corresponding distributed ledger to reflect the processed event.

7. The method of claim 6, wherein the event processing request comprises a request to exchange a first type of cryptocurrency for a second type of cryptocurrency.

8. The method of claim 6, further comprising:

based on identifying a discrepancy between the first qubit and the second qubit, sending an error notification to a user device associated with the event processing request.

9. The method of claim 6, wherein the smart contract defines correlations between values associated with event processing requests and corresponding hashing methods.

10. One or more non-transitory computer-readable media storing instructions that, when executed by a quantum entanglement platform comprising at least one processor, a communication interface, and memory storing a quantum mempool queue manager, a quhash generator, a quantum circuit, a quantum notifier, and a quantum validator, cause the quantum entanglement platform to:

receive an event processing request comprising a request to sell a first cryptocurrency in exchange for fiat currency;

add, via the quantum mempool queue manager, the event processing request to a processing queue maintained at a quantum mempool layer of the quantum entanglement platform;

responsive to the event processing request reaching a front of the processing queue, validate and process the event processing request using quantum proof of consent, wherein validating and processing the event processing request using the quantum proof of consent comprises:

generating, via the quhash generator and for the event processing request, a pair of qubits comprising an entangled photon pair in a superposition state, wherein the entangled photon pair comprises a first qubit associated with the quantum entanglement platform and a second qubit associated with a distributed ledger platform;

generating, via the quhash generator and based on the first qubit, a first quhash corresponding to the first qubit by:

identifying, based on a smart contract defining hashing protocols for request characteristics, a hashing protocol for the first qubit, and executing the hashing protocol on the first qubit;

publishing the second qubit to the distributed ledger platform, wherein the distributed ledger platform is configured to:

generate a second quhash corresponding to the second qubit, and store the second quhash t a node of the distributed ledger;

sending, via the quantum circuit, one or more commands directing the distributed ledger platform to execute a Grover's algorithm to identify a node in the distributed ledger matching the first quhash, wherein the second quhash is stored at the node, and wherein sending the one or more commands directing the distributed ledger platform to execute the Grover's algorithm causes the distributed ledger platform to execute the Grover's algorithm;

receiving, via the quantum notifier and from the distributed ledger platform, the second quhash;

decrypting, via the quantum validator, the first quhash and the second quhash to produce the first qubit and second qubit respectively;

comparing, via the quantum validator, the first qubit to the second qubit; and based on identifying a match between the first qubit and the second qubit:

processing the requested event, and causing the distributed ledger platform to update a corresponding distributed ledger to reflect the processed event.

11. The quantum entanglement platform of claim 1, wherein the distributed ledger platform is configured to cache results of the Grover's algorithm based on a caching protocol specified in the smart contract.

12. The quantum entanglement platform of claim 11, wherein the caching protocol specifies what information should be cached based on one or more of: value thresholds or geocoordinates associated with the event processing request.

13. The quantum entanglement platform of claim 11, wherein the caching protocol causes the distributed ledger platform to:

identify whether the event processing request prioritizes processing time or security;

based on identifying that the event processing request prioritizes processing time, cache the results of the Grover's algorithm; and based on identifying that the event processing request prioritizes security, identify that the results of the Grover's algorithm should not be cached, thereby causing the Grover's algorithm to be re-executed for subsequent event processing requests.

14. The quantum entanglement platform of claim 1, wherein the smart contract defines a first hashing protocol for event processing requests within a first value range and a second hashing protocol for event processing requests within a second value range.

15. The method of claim 6, wherein the distributed ledger platform is configured to cache results of the Grover's algorithm based on a caching protocol specified in the smart contract.

16. The method of claim 15, wherein the caching protocol specifies what information should be cached based on one or more of: value thresholds or geocoordinates associated with the event processing request.

17. The method of claim 15, wherein the caching protocol causes the distributed ledger platform to:

identify whether the event processing request prioritizes processing time or security;

based on identifying that the event processing request prioritizes processing time, cache the results of the Grover's algorithm; and based on identifying that the event processing request prioritizes security, identify that the results of the Grover's algorithm should not be cached, thereby causing the Grover's algorithm to be re-executed for subsequent event processing requests.

18. The method of claim 15, wherein the smart contract defines a first hashing protocol for event processing requests within a first value range and a second hashing protocol for event processing requests within a second value range.

19. The one or more non-transitory computer-readable media of claim 10, wherein the distributed ledger platform is configured to cache results of the Grover's algorithm based on a caching protocol specified in the smart contract.

20. The one or more non-transitory computer-readable media of claim 19, wherein the caching protocol specifies what information should be cached based on one or more of: value thresholds or geocoordinates associated with the event processing request.

* * * * *